United States Patent [19]

Leng et al.

[11] Patent Number: 5,230,364
[45] Date of Patent: Jul. 27, 1993

[54] PRESSURE RELIEF VALVE

[75] Inventors: John L. Leng, Havant, England; Tsuyoshi Ando; Kousuke Hatakenaka, both of Sano; Akio Mito, Yokohama, all of Japan

[73] Assignees: Vickers, Incorporated, Troy, Mich.; Tokimec Inc., Tokyo, Japan

[21] Appl. No.: 833,915

[22] Filed: Feb. 11, 1992

[30] Foreign Application Priority Data

Apr. 6, 1991 [GB] United Kingdom ............... 9107267
Jun. 28, 1991 [JP] Japan ........................ 3-49815

[51] Int. Cl.⁵ ............................................. F16K 17/06
[52] U.S. Cl. ..................................... 137/514; 137/514.3; 137/529; 137/540
[58] Field of Search ............... 137/514, 514.3, 515.5, 137/529, 540

[56] References Cited

U.S. PATENT DOCUMENTS

| 3,791,408 | 2/1974 | Saitou | 137/529 |
| 4,211,147 | 7/1980 | Panissidi | 137/595 X |
| 4,223,693 | 9/1980 | Kosarzecki | |
| 4,548,233 | 10/1985 | Wolfges | 137/529 |
| 5,050,637 | 9/1991 | Sagawa | 137/529 |

FOREIGN PATENT DOCUMENTS

| 1096559 | 12/1953 | France | |
| 19892 | 6/1971 | Japan | 137/529 |
| 492217 | 1/1974 | Japan | |

Primary Examiner—Robert G. Nilson
Attorney, Agent, or Firm—Barnes, Kisselle, Raisch, Choate, Whittemore & Hulbert

[57] ABSTRACT

A proportional pressure release valve comprising a valve body incorporating a valve seat, a valve closure member mounted in the valve body and cooperable with the valve seat to control flow of fluid through the valve from an inlet pressure port to an outlet tank port, and electromagnetic control means having a push pin operable to move, via resilient means, the valve closure member in dependence upon the magnitude of a control current applied thereto, wherein the valve further comprises damper means provided between the push pin and the valve closure member. The valve may also comprise an anti-cavitation ring having a bore and disposed downstream of the valve seat, the anti-cavitation ring being apertured to provide a fluid connection between the ring core and the tank port. The valve closure member may be guided for movement towards and away from the valve seat by guide means comprising at least one linear bearing.

24 Claims, 7 Drawing Sheets

PRESSURE RELIEF VALVE

BACKGROUND OF THE INVENTION

This invention relates to a pressure relief valve which may be used as a single stage valve or as a pilot valve for a two-stage pressure control valve. The invention also has particular, but not exclusive, reference to a proportional pressure relief valve and is also applicable either to pneumatic or hydraulic valves.

Known pressure relief valve suffer the problem of instability which manifests itself as a physical oscillation of the valve closure member or poppet. It is an object of the present invention to provide a more stable pressure relief valve with low pressure/control current hysteresis.

SUMMARY OF THE INVENTION

According to one aspect of the present invention, there is provided a proportional pressure relief valve comprising a valve body incorporating a valve seat, a valve closure member mounted in the valve body and co-operable with the valve seat to control flow of fluid through the valve from an inlet pressure port to an outlet tank port, and electro-magnetic control means having a push pin operable to move, via resilient means, the valve closure member in dependence upon the magnitude of a control current applied thereto, when the valve further comprises damper means provided between the push pin and the valve closure member wherein the damper means is in the form of a dash pot, and wherein the resilient means in the form of a return or buffer spring which acts between two spring rests associated with the push pin and valve closure member, respectively, the dash pot comprising a piston carried by one spring rest and a cylinder carried by the other spring rest. The dash pot piston may be formed integrally with the one spring rest or formed separately and attached to the spring rest by bonding or other means. The dash pot cylinder may be provided in the other spring rest such as by forming a blind hole therein but preferably by providing a through hole in order to facilitate manufacture the hole being closed off at one end by suitable closure means after manufacture.

In an alternative embodiment, one spring rest is itself formed as the dash pot piston and the other spring rest is itself formed as the dash pot cylinder, with the return spring being disposed within the cylinder.

It is convenient to provide a suitable clearance between the dash pot piston and cylinder to effect the required damping but other means, such as a bleed hole in the cylinder, may be employed.

The use of damper means serves to damp any relative oscillation between the valve closure member and the armature of the electro-magnetic control means, which may be a solenoid, and thus improves the stability of the valve.

According to a second aspect of the present invention, there is provided a pressure relief valve comprising a valve body incorporating a valve seat, a valve closure member mounted within the valve body and co-operable with the valve seat to control the flow of fluid through the valve from an inlet pressure port to an outlet tank port, characterised in that the valve further comprises an anticavitation ring disposed downstream of the valve seat, the ring being apertured to provide a fluid connection between the ring bore and the tank port.

The end of the ring facing the valve seat and the valve seat itself may be of any form provided the shapes and relative positions are such that the fluid emanating from the gap between the valve closure member and the valve seat is deflected. This arrangement reduces cavitation. The combined angle between the valve seat and the end of the ring is preferably such that the fluid flow is deflected through an angle of at least 60°, with greater angles of deflection providing improvements in anticavitation effect. Consequently the end of the ring may be a flat surface generally perpendicular to the axis of the valve closure member, or be frusto-conical, or have a curved surface, for example.

The provision of an anti-cavitation ring in accordance with this aspect of the present invention has proved satisfactory in preventing cavitation and the associated noise and erosion so improving the stability and durability of the valve and stability of flow through the valve. In addition it has been found that a further improvement can be obtained by dimensioning the opposite end of the bore of the ring member so as to be a sliding fit on the valve closure member. With such an arrangement, very good valve stability can be obtained if combined with the use of small orifices in the pressure and tank ports. Unfortunately, the use of small orifices results in a high pressure setting when the valve is de-energised. However, the size of these orifices can be enlarged if the damper means according to the first aspect of the present invention are incorporated into the pressure relief valve of the second aspect of the invention.

With the provision of anti-cavitation ring in accordance with the second aspect of the invention, fluid impinges on the ring with the result that local fluid velocity is reduced, and hence static pressure is increased. The increased static pressure avoids or reduces the risk of fluid cavitation and the associated pressure instability.

It has been found that the anti-cavitation ring can be used with a generally cylindrical, flat-ended valve closure member and tapered valve seat or vice versa, or with both a tapered valve seat and tapered valve closure member.

Another factor affecting valve stability is the introduction of air into the hydraulic fluid, when such is employed. In a proportional pressure relief valve, the movement of the solenoid push pin in controlling the position of the valve closure member can introduce air into the hydraulic fluid and it is desirable not to have to require the user of the valve to carry out a bleeding operation from time to time. It has been found that trapped air in the solenoid of some existing pressure relief valves causes pressure instability in the form of 20–100 Hz oscillations.

The valve according to the second aspect of the invention may be a proportional valve and the push pin of the electro-magnetic proportional control means is preferably hollow. A hollow push pin may also be used with the first aspect of the invention.

The use of a hollow push pin allows most of the air trapped in the electro-magnetic control means to be displaced by hydraulic fluid and movement of the armature of the control means. A hollow push pin also serves to prevent de-stabilising pressure difference between the ends thereof which can arise with solid push pins. A restrictor or orifice may be provided in the tank port and dimensioned so as to provide an increase in pressure inside the valve and electro-magnetic control means when the flow through the valve increases. In the event of a flow surge this increase in pressure will, because of the hollow push pin, be applied to the end of the iron core furtherest from the valve closure member before being applied to the end of the iron core nearest to the valve closure member. The result of this sequence of events is the iron core will be pressed towards the valve closure member which in turn moves towards the valve seat so tending to reduce the flow surge rather than increase the flow surge which would be the result if the sequence of application of the pressure on the iron core were reversed. For this reason it is preferable for the holow push pin to be arranged to provide the predominant connection between the fluid upstream of the orifice in the tank port and the electromagnetic control means.

Attempts have been made to produce the hollow push pin by machining a very hard grade of stainless steel (of the order of 40 HRC) so as to use a material similar to that employed with known solid push pins. However, it was soon appreciated that this grade of stainless steel is unsuitable for manufacture, on a production basis, of a push pin of the order of 70 mm long and having a 3 mm diameter through bore. The hollow push pin needs to satisfy the following requirements:

a) Substantially non-magnetic (for efficient electro-magnetic control means operation).

b) Have a hard surface on the outer diameter capable of withstanding rolling action of ball bearings over at least part of its length.

c) The material used to be readily machineable for drilling and/or available in tube form.

d) Low friction finish for compatibility with a bush type bearing associated with part of its length, the bush bearing being composed, for example, of PTFE.

A more readily machineable grade of stainless steel is first selected and one example of a suitable material is 18/10 austenitic stainless steel but in view of its relative softness, it was necessary to provide it with a hard outer surface. Electro-deposited chrome plating of the order of 0.05 mm thick was tried as this is used on existing solenoids but this proved unsatisfactory because the load forces are such that indentation occurred after a relatively short test period. Plasma nitriding was also tested as this is known to produce a very hard surface (of the order of 1000 Hv) but the process can produce deviations in the straightness of the push pin which is unsatisfactory and also, the process gives rise to a slightly matt finish which is also undesirable. A PTFE-nickel matrix was also used, being electroless deposited, but again the hardness was insufficient to pass endurance tests.

Next, electroless nickel plating was tried, first using a medium phosphorous content, i.e. a phosphorous content of 6-10%. The hardness of the surface produced on the push pin was generally satisfactory but varied from batch to batch, it being believed that this is due to the difference in phosphor content within the 6-10% specification range. The phosphorous content affects the hardness and ductility of the plated surface. Finally, electroless nickel with a relatively high phosphorous content (10%+) was tested, together with post-plating heat treatment temperatures. Push pins heat treated at 400° C. failed after $15 \times 10^6$ cycles of endurance testing and the nature of the plating failure indicated lack of ductility in the plating. Accordingly, a reduced hardness was tested, this being produced by lowering the heat treatment temperature to 300° C.

Thus according to a first preferred feature of the present invention, the push pin is formed from a free-machining, substantially non-magnetic material from which the push is to be manufactured, and is coated, at lest the outside of the push pin with an electroless nickel having a phosphorous content of at least 10% by weight or a boron content of 1-5%, inclusive, by weight, and being heat treated at a temperature between 250° C. and 350° C., inclusive.

This aspect of the invention is applicable to both solid and hollow push pins as the advantage of using free-machining material is applicable to both although more so to the latter.

Preferably, the stock used for the push pin is 18/10 austenitic stainless steel which has a hardness of approximately 300 Hv.

The first preferred feature of the present invention is advantageously employed with the first and/or second aspects of the present invention.

Another problem associated with pressure relief valves is that of high hysteresis due to friction between the valve closure member and the guide means thereof. A still further problem is that of accurate alignment between the valve closure member and the valve seat, which alignment can be impaired if the guidance of the valve closure member in moving towards and away from the valve seat is not accurately controlled.

According to second preferred feature of the present invention, the valve closure member is guided for movement towards and away from the valve seat by guide means comprising at least one linear bearing employing rolling members.

It has been found that the use of such a guided valve closure member gives rise to good or low hysteresis whilst maintaining accurate alignment with the valve seat which thus reduces leakage and good repeatability when employed in a proportional pressure relief valve. Furthermore, ball or roller bearings are more tolerant to contaminated fluid than a plain bush-type bearing.

The or each linear bearing may comprise a housing which may be integral with the valve seat assembly or be a separate component aligned therewith. The cage of the or each bearing may be held stationary or be arranged to move with the valve closure member.

The feature of the guided valve closure member using a linear bearing according to the second preferred feature of the present invention may be used with either of the first third aspects of the invention and with said first preferred feature.

BRIEF DESCRIPTION OF THE DRAWINGS

Proportional pressure relief valve embodying the various aspects of the present invention will now be described in greater detail, by way of example, with reference to the accompanying drawings in which.

DESCRIPTION OF THE ILLUSTRATED EMBODIMENTS

Figure 1:
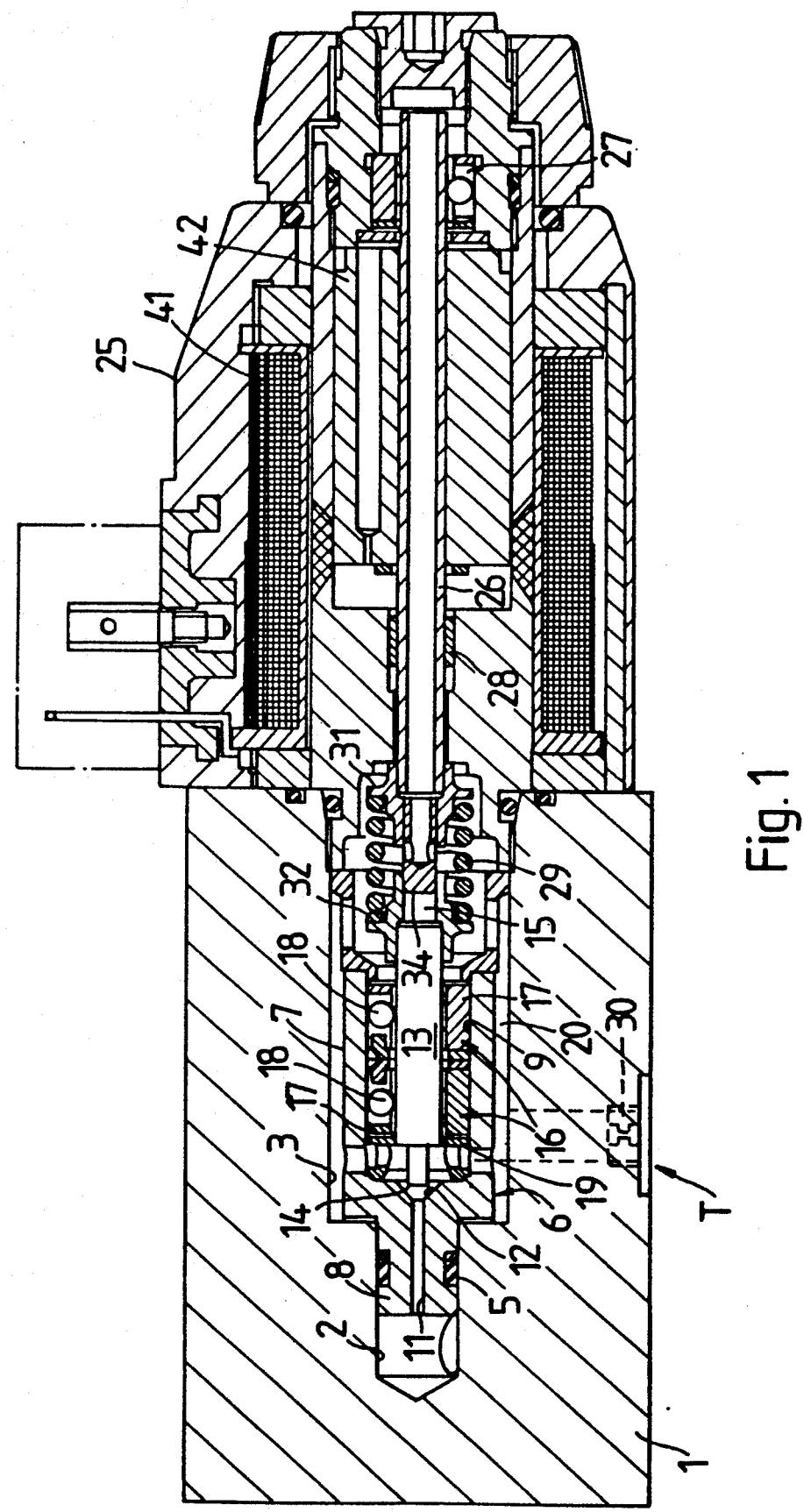
FIG. 1 is a longitudinal section of one pressure relief valve.

The valve illustrated in FIG. 1 of the drawings is an electro-hydraulic proportional pressure relief valve designed for mounting on an ISO 4401 Size 3 interface. It is designed to regulate pressure in an hydraulic system in proportion to an applied electrical input and the maximum rated pressure and flow is 350 bar and 3 liters per minute, respectively. The valve may be used as a single stage valve or as a pilot stage for a larger pressure control valve.

Figure 4:
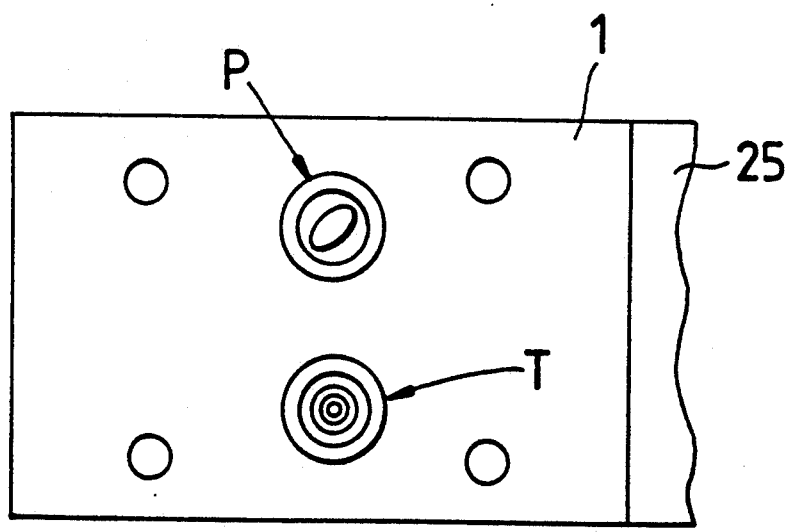
FIG. 4 is an enlargement of part of FIG. 1.

Referring to FIGS. 1 to 3 and 7, the overall pressure relief valve comprises a valve body 1 having a blind bore 2 which is counter-bored at 3. A pressure inlet port P (FIGS. 3 and 4) is connected by a drilling 4 (FIG. 3) to the inner, and smaller diameter, end of the blind bore 2. Sealed in the blind bore 2 by a seal 5 is a valve seat assembly 6 comprising a cylindrical member 7 which is a clearance fit in the counter-bore 3 of the valve body 1 and has an axial extension 8 which is sealed in the blind bore 2 by the seal 5. The cylindrical member 7 is provided with an axial bore 9 and the extension 8 with an axial bore 11, the bores 9 and 11 being co-axial. The inner end of the bore 9 is provided with a frusto-conical counter bore which provides an actual valve seat 12. Mounted for axial sliding movement within the axial bore 9 of the valve seat assembly 6 is a cylindrical valve closure member or poppet 13 which may have a reduced diameter end portion, the outer end 14 of which constitutes the actual valve closure member which is co-operable with the valve seat 12. The other end 15 of the valve closure member 13 is also of reduced diameter.

The valve closure member 13 is mounted for sliding movement within the axial bore 9 of the seat assembly 6 by way of a pair of linear ball bearings 16 each of which comprises an annular cage 17 in which are mounted a plurality of balls 18 which are capable of rolling movement within the cage.

At the inner end of the axial bore 9 of the seat assembly 6 there is mounted an anti-cavitation ring 19 (best seen in FIGS. 2 and 7) the basic bore of which is a clearance fit on the valve closure member 13. The end 21 of the bore of the ring 19 adjacent the valve seat 14 is outwardly flared and is of frusto-conical form. However, this flared portion 21 of the ring 19 may have a curved surface. A diametral bore 22 is formed in the ring 19 with the ends thereof being in alignment with respect to radial bores 23 provided in the cylindrical member 7 of the valve seat assembly 6. In turn the radial bores 23 open into the annular space 20 between the cylindrical member 7 and the counter-bore 3 of the valve body 1, which annular space connects with a tank drilling 24 leading to a tank port T and fitted with a restrictor or orifice 30.

Fitted (and sealed) to the end of the valve body 1 from which the blind bore 2 is formed is a proportional solenoid 25 basically of conventional form except for the push pin 26 which is hollow rather than of solid rod construction. The solenoid 25 may be of the push or pull type but a push type is illustrated. The outer end of the push pin 26 is supported in a ball bearing 27 and supported towards its inner end in a bearing bush 28. A return or buffer spring 29 is disposed between the valve closure member 13 and the push pin 26, the ends of the spring being received in respective spring rests 31 and 32. Each of the spring rest 31 and 32 has a through bore 33 and bonded to the spring rest 31 within the bore 33 is a piston 34 having an axial blind bore 35 and a diametral bore 36 which intersects the blind bore 35. The bore 35 of the piston 34 in effect extends the through bore of the push pin 26 and connects the latter with an end chamber 37 of the valve body 1, which chamber is connected to the tank port T through passageways not shown. It will be seen that the end of the push pin 26 is received in a counter-bore 38 in the spring rest 31, these two components being mounted so as to move in unison.

The spring rest 32 associated with the valve closure member 13 is of identical form to the spring rest 31 but is reversed so as to receive in its counter-bore 38 the end of the valve closure member 13 which is bonded in that counter-bore. The bore 33 of the spring rest 32 forms a cylinder 39 which receives, as a clearance fit, the piston 34, the piston and cylinder forming a dash pot arrangement.

In use of the valve, a control current is applied to the coils 41 of the solenoid 25 and the resulting magnetic field moves an armature 42 with which the push pin 26 is associated, and hence the push pin is moved out of the solenoid and into the valve body 1. This movement of the push pin 26 is transmitted to the valve closure member 13 via the buffer spring 29 and hence the valve closure member 13 is moved towards the valve seat 12 to regulate the flow of pressure fluid through the valve from the pressure port P to the tank port T. The main pressure drop of pressure fluid passing through the valve is dependent on the force acting on the valve closure member 13, the flow rate of the pressure fluid and the viscosity of the fluid. The force acting on the valve closure member is dependent on the magnitude of the control current applied to the solenoid coils 41.

The high velocity fluid flowing through the axial bore 11 of the extension 8 of the seat assembly 6 can result in low local static pressure and if the pressure is low enough, cavitation will occur. The anti-cavitation ring 19 helps to prevent cavitation by presenting the end of the ring 21 to the issuing fluid on which it impinges. By positioning the end of the ring as close as possible to the seat and deflecting the flow through an angle in excess of 90° a high anti-cavitation effect is obtained. Any cavitation which does occur will cause valve instability which manifests itself by physical oscillation of the valve closure member 13. Should cavitation occur in spite of the presence of ring 19, the resulting oscillation is damped by the dash pot arrangement of the cylinder 39 and piston 34, the clearance fit between these two components providing a restricted path for the fluid and hence providing damping. The magnitude of damping is dependent on the :

1. Clearance between the piston 34 and the cylinder 39.
2. Diameter of the piston 34.
3. Length of the engagement between the piston 34 and the cylinder 39.
4. Viscosity of the fluid the flow of which the valve is controlling.

Stable valve performance has been obtained with a suitable clearance between the piston 34 and cylinder 39.

The valve closure member 13 is guided for sliding movement within the valve seat assembly 6 by the two linear ball bearings 18 which provide a low coefficient of friction between these two components so that good hysteresis is obtained for the valve. Furthermore, the accurate guidance of the valve closure member 13 means that there is always accurate alignment between the actual valve closure member 14 and the valve seat 12 so that there is low leakage.

Figure 2:
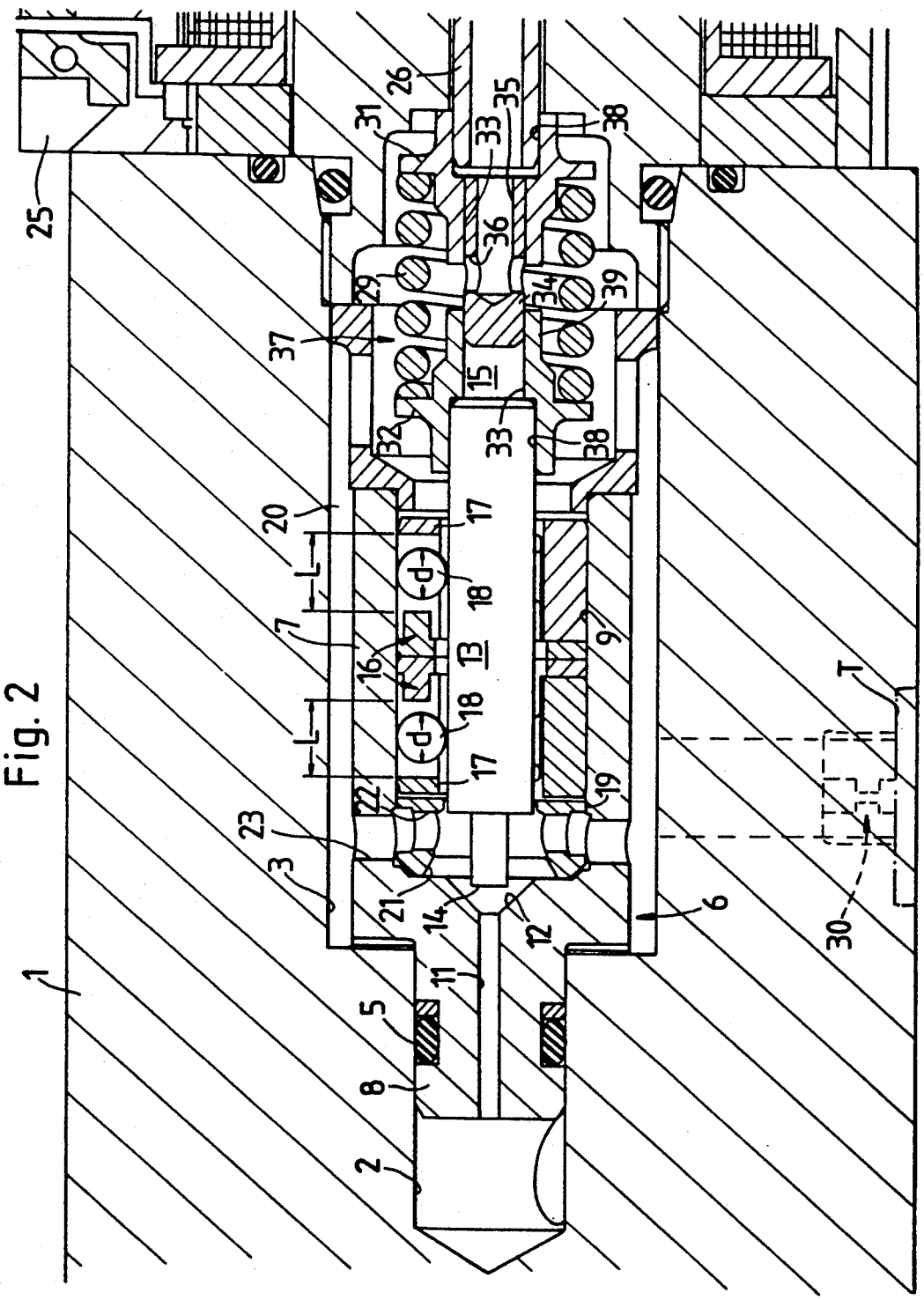
FIG. 2 is a view from the left-hand end of FIG. 1.
Figure 3:
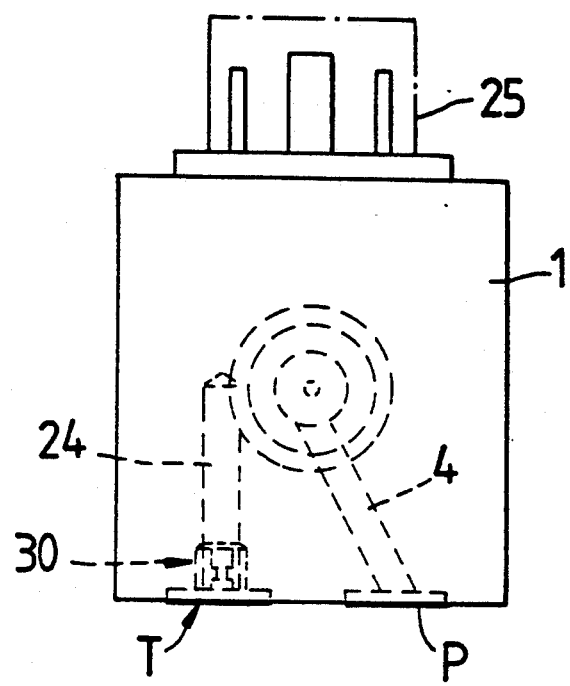
FIG. 3 is a partial plan view from below of FIG. 1.

As already mentioned, each ball 18 is free to roll within the cage 17 and the ball movement within the cage determines the stroke of the valve closure member 13 on the basis of:

$$STROKE = 2(L-d)$$

Where L is the length of the cage aperture in which each ball 18 can move, and d is the diameter of the ball bearing. L and d are shown in FIG. 2.

Thus, it will be seen that a pressure relief valve embodying the various aspects of the present invention is extremely stable, has low leakage and has a good hysteresis characteristic, whereby a significant advance in the art is obtained.

Returning now to the hollow push pin 26, the use of this means that the user of the valve does not have to effect any bleeding operations in order to exclude air from the solenoid. The majority, if not all, of the air trapped in the solenoid is displaced by the pressure fluid and movement of the armature 42. The orifice 30 associated with the T port provides sufficient back pressure in the solenoid. However, special attention has to be paid to the manufacture of the push pin because, as already explained, it is not realistic to produce such push pins, on a production basis, from hard stainless steel stock because the machining operation is difficult. In accordance with one aspect of the present invention, the push pin 26 is made from an austenitic, free-cutting or free-machining stainless steel (which is virtually non-magnetic) and which is readily machined into either a solid or a hollow push pin. One particular austenitic steel is that known as 18/10 austenitic stainless steel having a hardness of approximately 300 Hv. After drilling the through bore in the push pin 26, the pin is coated with a nickel-phosphorous alloy using the electroless plating technique although it may be coated with a nickel-boron alloy using the same technique to give a hard, low friction bearing surface on the outer surface and/or the inner surface of the push pin. When a nickel-phosphorous alloy is used, the phosphorous content is preferably 10-14%, inclusive, by weight. When a nickel-boron alloy is used, the boron content is 1-5%, inclusive, by weight. After plating, the push pin 26 is heat treated to improve surface hardness and adhesion of the plating and when using a nickel-phosphorous alloy, heat treatment for one hour at 300° C. has been found satisfactory. The plating provides a hard durable surface on the push pin 26 which can be used with a PTFE type bush bearing 28 and the ball bearing 27. A significant advantage of this plating technique is that no further machining or other treatment of the push pin is necessary after plating and heat treating.

Figure 5:
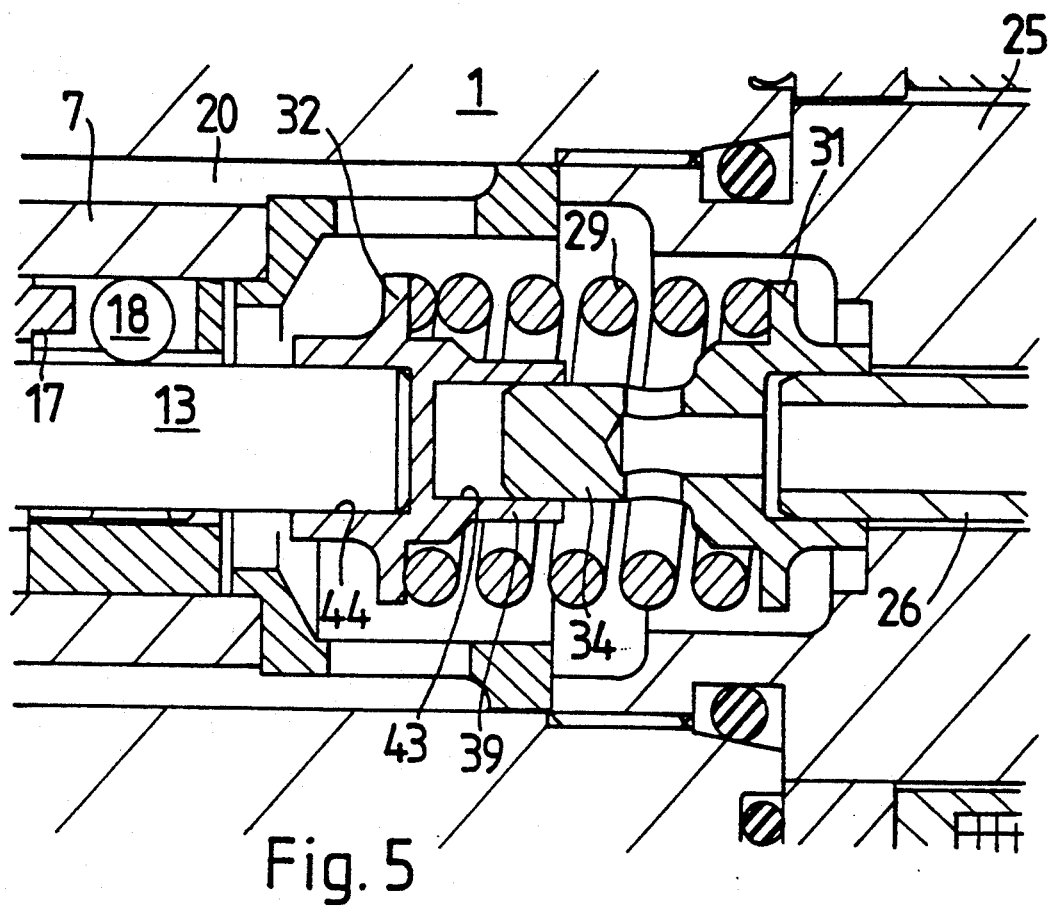
FIG. 5 is a view, to a larger scale, of part of FIG. 1 but showing an alternative arrangement.

Turning now to FIG. 5 of the drawings, this shows an alternative arrangement of the spring rests 31 and 32 which in this arrangement are not identical as they were in the embodiment of FIG. 1. The spring rest 31 has the dash pot piston 34 formed integrally therewith, the piston having the blind bore 35 and cross-bore 36 as before. The spring rest 32 is provided with a blind bore 43 to form the cylinder 39 and the valve closure member 13 is located, with or without bonding, in another blind bore 44 formed at the other end of the spring rest, coaxial with the blind bore 43. Although this arrangement operates satisfactorily, it does give rise to greater manufacturing costs in view of the fact that identical spring rests cannot be employed and one of them has to be formed with two blind bores.

Figure 6:
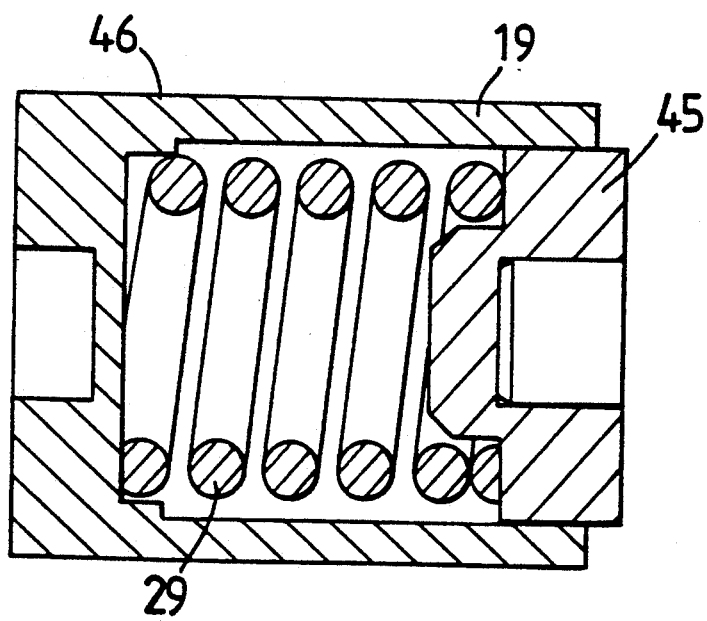
FIG. 6 is a part view of FIG. 5 but showing a still further alternative arrangement.

Turning now to FIG. 6, this illustrates a still further alternative of spring rest and dash pot arrangement and in this embodiment, the spring rest 45 associated with the push pin 26 itself forms the piston of the dash pot arrangement, with the other spring rest 46 itself providing the cylinder 39 in which the spring rest piston 45 is mounted, the buffer spring 29 being disposed within this cylinder and acting between the closed end thereof and the spring rest piston 45.

Figure 11:
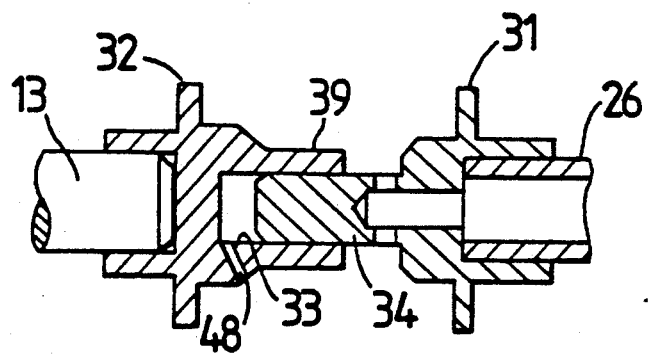
FIG. 11 is a view similar to FIG. 5 but showing a still further alternative arrangement.

FIG. 11 illustrates a still further arrangement of spring rest and dash pot arrangement which is essentially the same as that of FIG. 5 except that the clearance between the piston 34 and the bore 33 of the cylinder 39 is less than in the previous arrangements. Damping is obtained by forcing the fluid to enter and leave the cylinder 39 via a restrictor in the form of a bleed hole 48; the diameter which governs the degree of damping.

Figure 7:
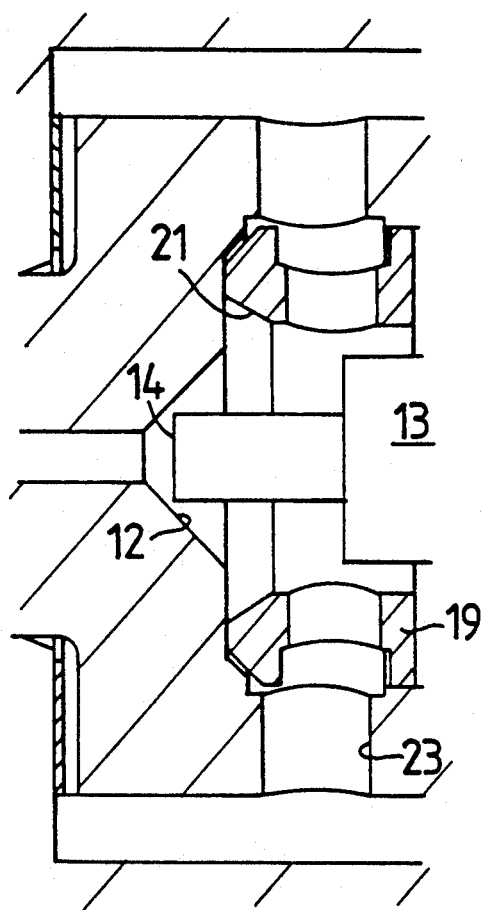
FIG. 7 is a view, to a larger scale, of a different part of FIG. 4, FIGS. 8 and 8a are views similar to FIG. 7 but showing different alternative arrangements.
Figure 8:
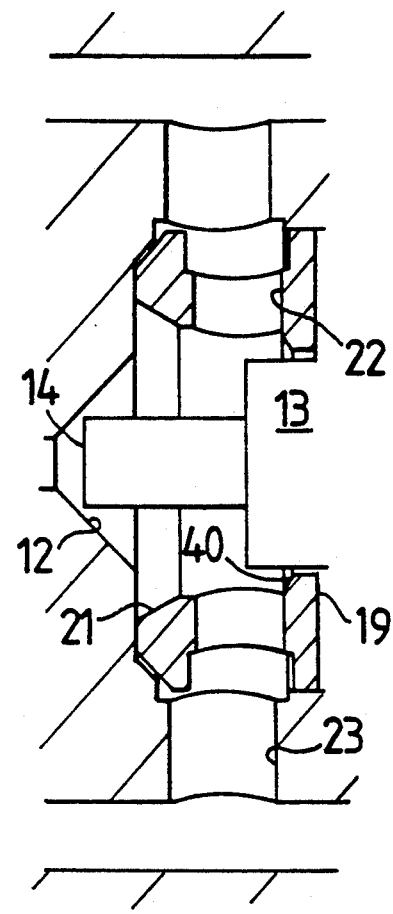

FIG. 8 illustrates an alternative arrangement of the anti-cavitation ring 19 which is essentially the same as that illustrated in FIGS. 1,2 and 7 in that a frusto-conical flared end 21 is provided adjacent the valve seat 12, this flared portion having a taper or chamfer of 30°. However, in addition, rather than the ring being a clearance fit with respect to the valve closure member 13, the non-flared end of the bore of the ring is of reduced diameter so as to provide a "capped end" 40 to the ring which has a small radial clearance of the order of 0.2 mm with respect to the valve closure member 13. With this arrangement of a flared end and a capped end, the stability of the valve has been found to be much improved.

Figure 8A:
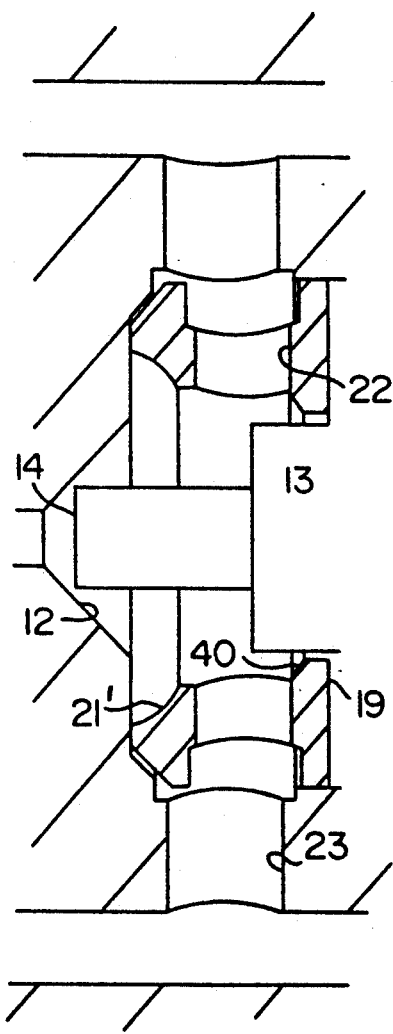

FIG. 8a illustrates an anti-cavitation ring 19 having a curved surface 21' rather than a frusto-conical surface as in FIGS. 1 and 8.

Figure 9:
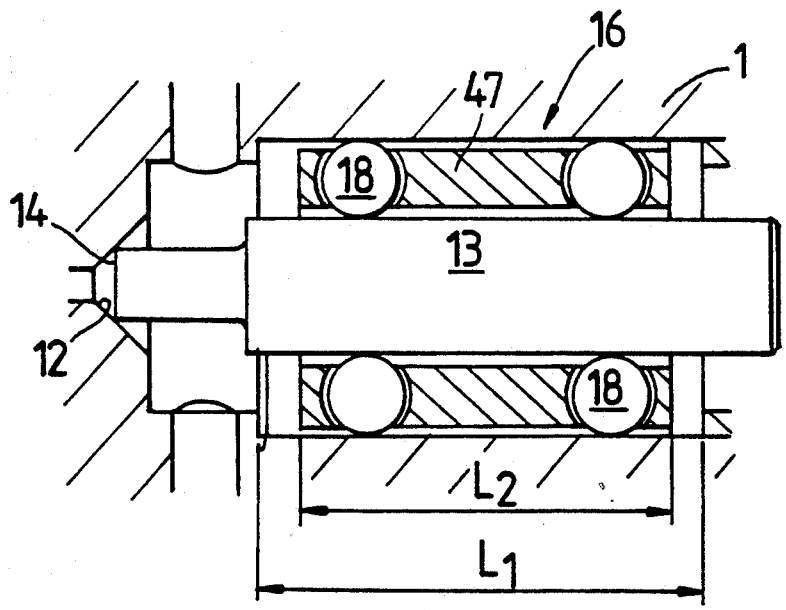
FIG. 9 is a part view of FIG. 4 but showing an alternative arrangement of valve closure member guidance.

Turning to FIG. 9, this illustrates an alternative arrangement for the guidance of the valve closure member 13. In the embodiment of FIG. 1, the cages 17 of the ball bearings 16 were fixedly mounted in the cylindrical member 7 of the valve seat assembly 6 but in the arrangement of FIG. 9, the cages 47 are mounted for movement with the valve closure member 13, the cages still allowing the balls 18 to rotate therewithin. With this arrangement, the stroke of the valve closure member 13 is given by:

$$STROKE = 2(L_1 - L_2)$$

Where $L_1$ is the axial length of the space within which the cage 47 can move, and $L_2$ is the axial length of the cage.

Figure 10:
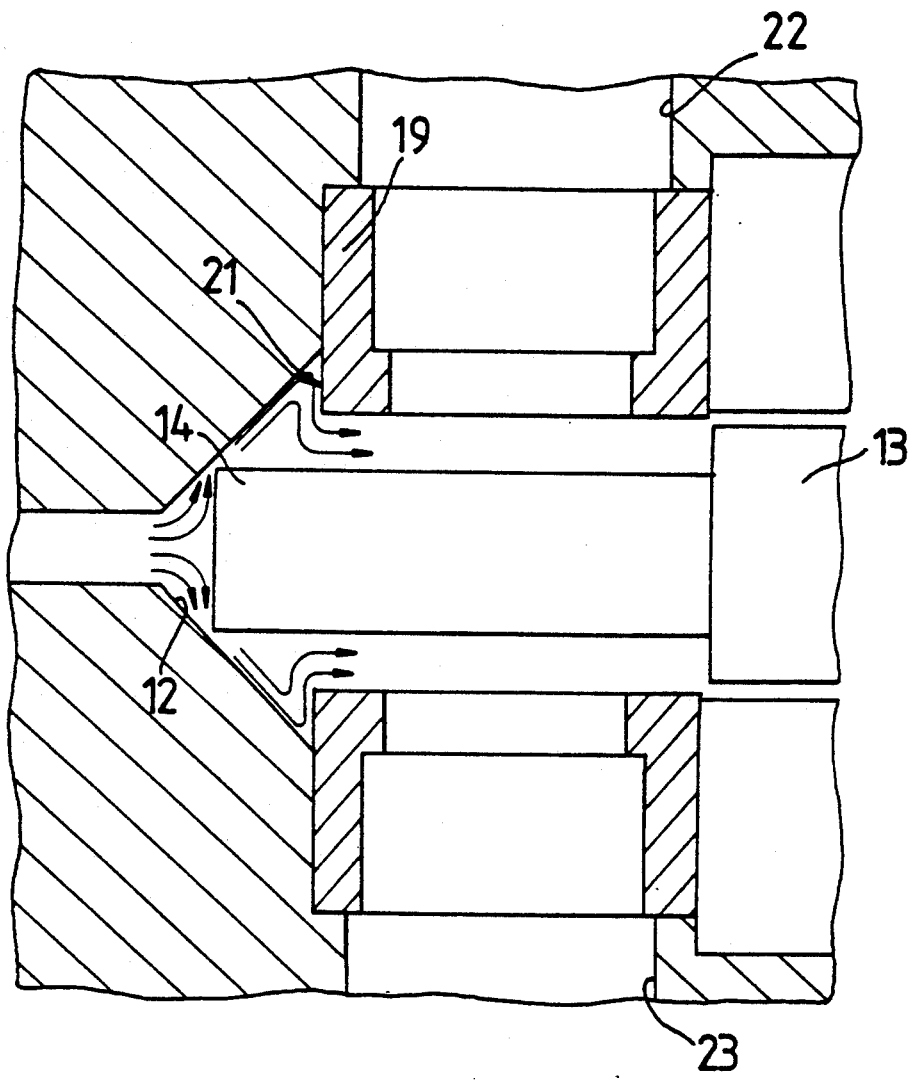
FIG. 10 is a view similar to FIG. 7 but showing a still further alternative arrangement.

Referring to FIG. 10 this shows an alternative form of anti-cavitation ring 19 in which the end 21 positioned close to the valve seat 12 is not flared but is perpendicular to the axis of the closure member so causing the flow to be deflected through an angle greater than 90°. With the use of a 45° tapered valve seat 12, fluid is deflected through 135° (90°+45°).

We claim:

1. A proportional pressure release valve comprising a valve body incorporating a valve seat, a valve closure member mounted in the valve body and co-operable with the valve seat to control flow of fluid through the valve from an inlet pressure port to an outlet tank port, and electro-magnetic control means having a push pin operable to move, via resilient means, the valve closure member in dependence upon the magnitude of a control current applied thereto, wherein the valve further comprises damper means provided between the push pin and the valve closure member, wherein the damper means is in the form of a dash pot, and wherein the resilient means is in the form of a buffer spring acting between two spring rests associated with the push pin and valve closure member, respectively, the piston of the dash pot being carried by one spring rest and the cylinder of the dash pot being provided by the other spring rest.

2. A valve according to claim 1, wherein the dash pot piston is formed integrally with said one spring rest.

3. A valve according to claim 1, wherein the dash pot piston is a separate component and is attached to said one spring rest.

4. A valve according to claim 1, wherein the dash pot cylinder is provided within the other spring rest.

5. A valve according to claim 4, wherein the dash pot cylinder is formed by providing a blind hole in said other spring rest.

6. A valve according to claim 4, wherein the dash pot cylinder is provided by a through hole formed in said other spring rest, the hole being closed to form the dash pot cylinder.

7. A valve according to claim 1, wherein one spring rest is itself formed as the dash pot piston and the other spring rest is itself formed as the dash pot cylinder, with the buffer spring being disposed within the cylinder.

8. A valve according to claim 1, wherein the clearance between the dash pot piston and cylinder allows fluid to flow therethrough to and from the cylinder.

9. A valve according to claim 1, wherein fluid flows to and from the dash pot cylinder via a restrictor therein.

10. A valve according to claim 1, wherein the push pin is hollow.

11. A valve according to claim 10, wherein at least one of the ports of the group consisting of the tank port and the pressure port is provided with a restrictor.

12. A valve according to claim 10, wherein the valve closure member and the electromagnetic control means communicate only through the bore of the push pin.

13. A valve according to claim 1, wherein the valve closure member is generally cylindrical and flat-ended, and wherein the valve seat tapered.

14. A valve according to claim 1, wherein that the valve closure member is guided for movement towards and away from the valve seat by guide means comprising at least one linear bearing employing rolling members.

15. A valve according to claim 14, wherein the or each linear bearing comprises a housing mounted in an assembly which includes the valve seat.

16. A valve according to claim 14, wherein each bearing comprises a cage which is held stationary.

17. A valve according to claim 14, wherein the or each bearing comprises a cage which is moveable with the valve closure member.

18. A pressure relief valve comprising a valve body incorporating a valve seat, a valve closure member mounted within the valve body and co-operable with the valve seat to control the flow of fluid through the valve from an inlet pressure port to an outlet tank port, wherein the valve further comprises an anti-cavitation ring having a bore and disposed downstream of the valve seat, the ring being apertured to provide a fluid connection between the ring bore and the tank port.

19. A valve according to claim 18, wherein the end of the bore of the ring bore facing the valve seat flares outwardly towards the valve seat.

20. A valve according to claim 18, wherein the flared end of the ring bore has a curved surface.

21. A valve according to claim 18, wherein the end of the ring facing the valve seat is generally perpendicular to the axis of the valve closure member.

22. A valve according to claim 18, wherein the bore of the ring at the end of the ring bore facing the valve closure member is dimensioned so as to be a sliding fit with respect to the valve closure member.

23. A proportional pressure release valve comprising a valve body incorporating a valve seat, a valve closure member mounted int he valve body and co-operable with the valve seat to control flow of fluid through the valve from an inlet pressure port to an outlet tank port, and electro-magnetic control means having a push pin operable to move, via resilient means, the valve closure member in dependence upon the magnitude of a control current applied thereto, wherein the valve further comprises damper means provided between the push pin and the valve closure member, wherein the push pin is formed from a free-machining, substantially non-magnetic material and is coated, on at least the outside, with electroless nickel having a phosphorous content of at least 10% by weight, or boron content of 1–5%, inclusive, by weight, and being heat treated at a temperature in the range of 250° C. to 350° C., inclusive.

24. A valve according to claim 23, wherein the push pin is made from an austenitic stainless steel.

* * * * *